Patented Nov. 5, 1929

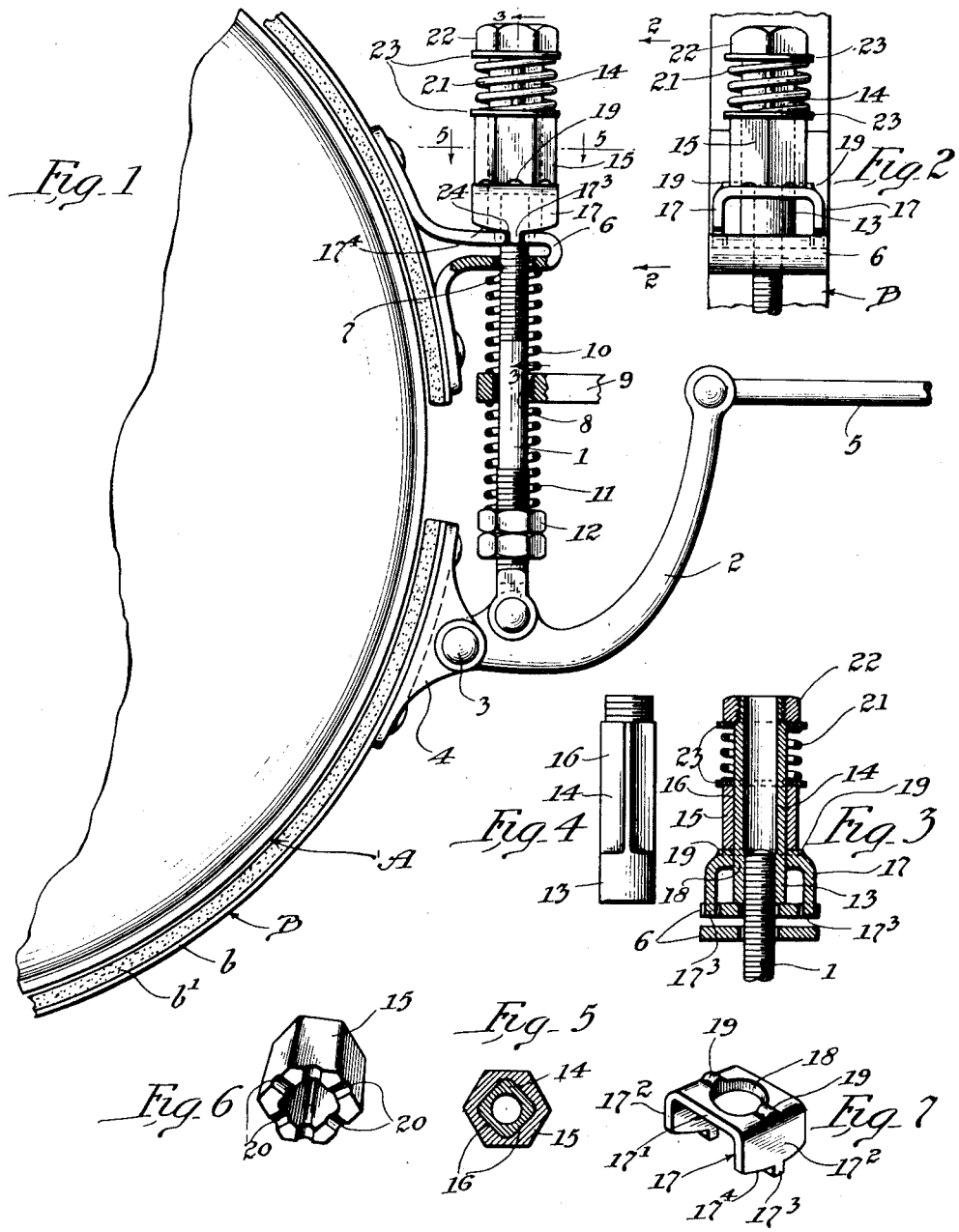

1,734,935

UNITED STATES PATENT OFFICE

GUY JOHN ZACCONE, OF CHICAGO, ILLINOIS

BRAKE MECHANISM

Application filed July 28, 1928. Serial No. 295,893.

This invention relates to brake mechanisms and relates particularly to the familiar type of brake mechanism comprising a brake drum secured to a rotatable part, a brake band adjusted to said drum, and means for contracting said brake band into frictional engagement with said drum.

As is generally well known, in brake mechanisms of the type specified, the ends of the brake band are connected by means of links or other means, said connecting means preferably being adjustable to provide for varying the operative size of the brake band in order to vary its frictional engagement with the brake drum in operation.

My invention has particular reference to brake mechanisms adapted for use on motor vehicles and in accordance with usual practice, in adjusting the tension of the brake bands, the car is "jacked up" so that the wheels to which the brakes are applied will turn freely. The brake is then released and the adjusting nut turned in one direction or the other, as the case may be, the brake applied and the wheels turned by hand to test the action of the brakes, this process being repeated until desired adjustment is obtained. Also, where there are two or more brakes, it is necessary to adjust the brakes separately to a substantially uniform tension, which also involves a similar "cut and dry" method. To adjust brakes in this manner usually requires considerable manipulation of the brake and adjusting nut and requires considerable time and not infrequently results in accepting a somewhat imperfect or "good enough" adjustment rather than to take the time, work and patience to perfectly adjust the brake.

The object of the present invention is to eliminate such "cut and dry" method of adjusting brake bands and to provide a method of adjustment whereby the brake band may be accurately adjusted while under tension without manipulation of the brake, said adjusting mechanism being constructed and arranged to permit the adjusting nut to be turned while the band is under tension, so that to adjust the brake, it is merely necessary to turn the adjusting nut until desired tension is obtained, which can be determined by turning the wheels by hand.

Stated generally, a brake mechanism embodying my invention and improvements, comprises a brake band, a link which connects the ends of said brake band, and means for varying the operative length of said link and the size of said brake band, comprising a nut having screw-threaded engagement with said link, a shank on said nut, a sleeve fitted to the shank of said nut so as to be movable endwise thereon, means engaging said sleeve with said nut causing them to turn together, a member provided with a hole to receive the nut threaded to said link against which an end of said sleeve abuts, means adapted to prevent rotation of said member, and means which connect said sleeve and member adapted to hold the same from relative turning movement in operation.

The invention also comprises the various other features, combinations of features and details of construction hereinafter described and claimed.

In the accompanying drawings in which my invention is fully illustrated:—

Figure 1 is a fragmentary side view, partly in section, of a brake mechanism comprising adjusting means embodying my invention and improvements;

Figure 2 is a fragmentary view showing my improved adjusting mechanism as seen from the right side of Fig. 1;

Figure 3 is a fragmentary sectional view of said adjusting mechanism taken substantially on line 3—3 of Fig. 1;

Figure 4 is a detached side view of the adjusting nut and parts integral therewith;

Figure 5 is a sectional view on the line 5—5 of Fig. 1; and

Figures 6 and 7 are detached perspective views of different parts of the adjusting mechanism.

Describing the invention with particular reference to the drawings, A designates the brake drum as a whole, B the brake band adjusted to said brake drum, as a whole, said brake band comprising a metal band $b$ and a lining $b'$ secured to the inner surface thereof and adapted to engage the drum A, in a usual manner.

The ends of the brake band are connected by means of a link 1, one end of which is pivotally connected to a lever 2, which is pivoted at 3 to a bracket 4 secured to the brake band B and the other end of which is adapted to be connected with the brake operating mechanism controlled by the driver of the vehicle by a rod 5, in a usual manner.

Secured to the end of the brake band B other than that to which the lever 2 is pivoted, is a bracket 6 formed through which is a hole 7 through which the link 1 extends. Intermediate its ends, the link 1 extends through a hole or opening 8 formed in a bar or bracket 9 secured to the frame of the vehicle in substantially fixed position, and when the brake is released, the ends of the brake band B are adapted to be forced apart so that it will be spaced from the surface of the brake drum A, by means of coiled springs 10 and 11 which surround the link 1 as a guide and which are inserted, respectively, between the fixed bar or bracket 9 and the bracket 6 and between said fixed bar or bracket and nuts 12 threaded to the link 1, all in a usual manner. The holes 7 and 8 are made sufficiently large so that the link 8 will not bind against the sides of said holes when the brake is applied by turning movement of the lever 2.

All of the foregoing members are old and well known and will readily be understood by persons familiar with the art from an examination of the drawings without a further description thereof in detail.

In accordance with my invention, the size of the brake band B and thus its frictional engagement with the brake drum A is adapted to be adjusted by means as follows: threaded to the end of the link 1 remote from its point of pivotal attachment to the lever 2, is a nut 13 which, when turned, is adapted to increase or decrease the operative length of the brake band B and thus its frictional engagement with the brake drum A. In the preferable construction shown, the means for turning said nut comprises a shank 14 formed on said nut, see particularly Figs. 3 and 4, adjusted to which so as to be movable endwise thereon is a sleeve 15, said shank and sleeve being connected so that they will rotate together. As shown, the engaging surfaces of said shank 14 and sleeve 15 are substantially square in cross-section, as best shown at 16, Fig. 5.

The lower end of the sleeve 15 rests upon a member 17 which is provided with a hole 18 adapted to receive the nut 13, so that said nut will turn freely therein, the engaging surfaces of said nut and hole being preferably circular.

The member 17 is secured against rotation by engagement with the brackets 6 and formed on said member 17 are projections 19 adapted to engage recesses 20 formed in the end of the sleeve 15 which abuts upon said member 17. The projections 19 and the recesses 20 are preferably rounded or inclined, and are maintained yieldingly in engagement with each other by a spring 21 inserted between the upper end of the sleeve 15 and a nut 22 threaded to the upper end of the shank 14 on the nut 13, washers 23 being preferably inserted at both ends of the spring 21.

With the described construction, it is obvious that engagement of the recesses 20 in the sleeve 15 with the projections 19 on the member 17 will hold the sleeve 15, the shank 14 and the nut 13 from turning movement relative to the link 1, while permitting said sleeve, shank and nut to be turned by means of a wrench applied to the sleeve 15, the outer surface of said sleeve, as shown, being preferably hexagonal in cross-section, the rounded or cam-shape of the projections 19 and recesses 20 operating to raise the sleeve 15 against the pressure of the spring 21 thus permitting turning movement of said sleeve relative to the member 17. As shown, there is a recess 20 in each face of the sleeve 15 and two of the projections 19 on the members 17, thus providing for making very delicate adjustments of the brake band. This relation, may, however, be variously changed.

As shown, the member 17 is made in the form of a yoke comprising a substantially flat intermediate portion $17'$, and depending end portions or flanges $17^2$, thus providing for making said member 17 from sheet metal by usual simple stamping operations.

As shown, also, the yoke or member 17 is held against rotation by means of lugs $17^3$ formed at the lower ends of the depending portions $17^2$ thereof, which loosely engage slots 24 formed in the bracket 6 secured to the brake band B.

As shown, also, the ends of the depending end portions $17^2$ of the yoke or member 17 which abut upon the bracket 6, are rounded, as shown at $17^4$, thus permitting rocking movement of said yoke or member and of the parts supported thereon with the link 1 when the brake is operated.

While I consider the form of my improved brake band adjusting means herein shown and described as the preferable embodiment of my invention, I do not desire or intend to limit myself thereto, as various modifications thereof in detail within the scope and contemplation of the invention will readily suggest themselves to skilled mechanics.

I claim:

1. Brake mechanism comprising a brake band, a link which connects the ends of said brake band, and means for varying the operative length of said link and size of said brake band, comprising a nut having screw-thread engagement with said link and which bears upon a rigid part of said brake band, a shank on said nut, a sleeve fitted to the shank of said nut so as to be movable endwise thereon, means preventing relative rotation of said sleeve and shank, a member provided with a hole to receive the nut threaded to said link against which an end of said sleeve abuts, means adapted to prevent rotation of said member, and means which connect said sleeve and member adapted to secure the same from relative turning movement in operation.

2. Brake mechanism as specified in claim 1, in which relative rotation of the shank on the adjusting nut and the sleeve thereon is prevented by engaging relatively flat surfaces thereon.

3. Brake mechanism as specified in claim 1, in which the engaging surfaces of the shank on the adjusting nut and the sleeve thereon are substantially square in cross section.

4. Brake mechanism as specified in claim 1, in which the sleeve on the shank of the adjusting nut has opposed parallel flat surfaces.

5. Brake mechanism as specified in claim 1, in which the member upon which the sleeve on the shank of the adjusting nut abuts, rests upon the same part of the brake band as the adjusting nut, and rotation of said member is prevented by interlocking parts on said member and brake band.

6. Brake mechanism as specified in claim 1, in which the member upon which the sleeve on the shank of the adjusting nut abuts, rests upon the same part of the brake band as the adjusting nut and rotation of said member is prevented by lugs thereon which engage holes in the part upon which said member rests.

7. Brake mechanism as specified in claim 1, in which the member upon which the sleeve on the shank of the adjusting nut abuts, rests upon the same part of the brake band as the adjusting nut, and rotation of said member is prevented by interlocking parts on said member and brake band the lower end of said member being rounded to permit rocking movement thereof with variations in the alignment of the link connecting the ends of the brake band in operation.

8. Brake mechanism as specified in claim 1, in which the member upon which the sleeve on the shank of the adjusting nut rests forms a yoke.

9. Brake mechanism as specified in claim 1, in which relative rotation of the sleeve on the shank of the adjusting nut and the member upon which said sleeve abuts is prevented by interlocking parts on the abutting ends of said sleeve and member.

10. Brake mechanism as specified in claim 1, in which relative rotation of the sleeve on the shank of the adjusting nut and the member upon which said sleeve abuts is prevented by interlocking parts on the abutting ends of said sleeve and member comprising projections on one thereof and corresponding recesses formed in the other.

11. Brake mechanism as specified in claim 1, in which relative rotation of the sleeve on the shank of the adjusting nut and the member upon which said sleeve abuts is prevented by interlocking parts on the abutting ends of said sleeve and member comprising projections on one thereof and corresponding recesses formed in the other said projections being cam-shaped, and engagement of said projections and recesses being effected by a spring applied to said sleeve.

12. Brake mechanism as specified in claim 1, in which relative rotation of the sleeve on the shank of the adjusting nut and the member upon which said sleeve abuts is prevented by interlocking parts on the abutting ends of said sleeve and member comprising projections on one thereof and corresponding recesses formed in the other, said projections being cam-shaped, and engagement of said projections and recesses being effected by a spring inserted between the end of the sleeve and a head on the shank of the adjusting nut.

In witness that I claim the foregoing as my invention, I affix my signature this 24th day of July, A. D. 1928.

GUY J. ZACCONE.